H. TRUST AND F. M. ASHLEY.
J. TRUST, ADMINISTRATRIX OF H. TRUST, DEC'D.
MIXING AND BEATING MACHINE.
APPLICATION FILED JAN. 21, 1920.

1,430,040.

Patented Sept. 26, 1922.

Inventor
Henry Trust
and
By their Attorney Frank M. Ashley

Patented Sept. 26, 1922.

1,430,040

UNITED STATES PATENT OFFICE.

HENRY TRUST, OF PARK RIDGE, NEW JERSEY, AND FRANK M. ASHLEY, OF BROOKLYN, NEW YORK; SAID ASHLEY ASSIGNOR OF HIS ONE-HALF INTEREST TO JOSEPHINE TRUST; JOSEPHINE TRUST ADMINISTRATRIX OF SAID HENRY TRUST, DECEASED.

MIXING AND BEATING MACHINE.

Application filed January 21, 1920. Serial No. 353,032.

*To all whom it may concern:*

Be it known that we, HENRY TRUST, a citizen of the United States, and resident of Park Ridge, in the county of Bergen and State of New Jersey, and FRANK M. ASHLEY, a citizen of the United States, and resident of Brooklyn, in the county of Kings and State of New York, have invented certain new and useful Improvements in Mixing and Beating Machines, of which the following is a specification.

Our invention relates to machines for mixing and beating food ingredients and the object of our invention is to provide a mixing machine for family use that may be furnished at a low price and is efficient in its operation.

Referring to the drawings which form a part of this specification:

Figure 1:
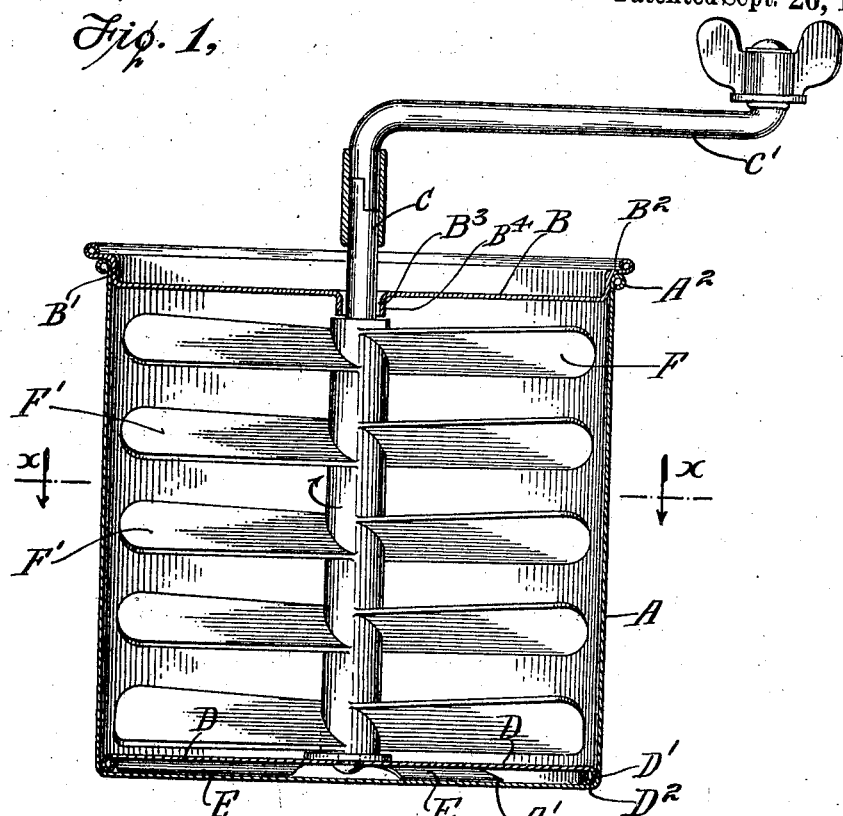
Figure 1 is a central sectional view of a machine embodying our invention.
Figure 2:
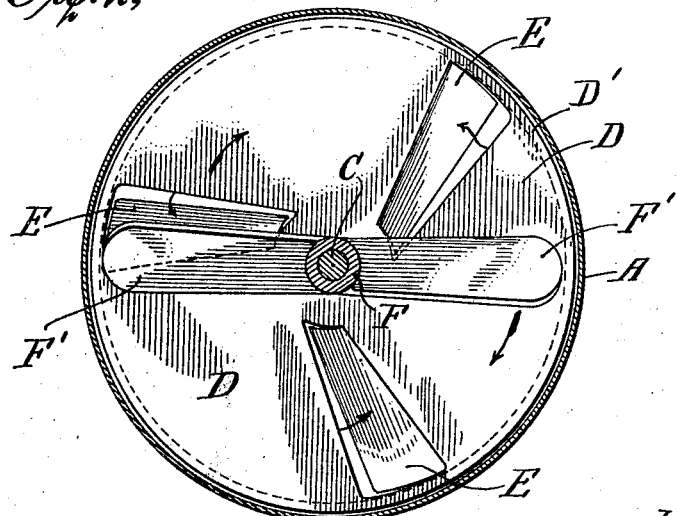
Figure 2 is a plan view taken on line $x$—$x$ of Figure 1.

A indicates a receptacle having a flat bottom A' and a flanged beaded edge $A^2$. B indicates a cover having a cylindrical portion B' which frictionally engages the inner wall of receptacle B, and a flange portion $B^2$ which rests on the rim of said receptacle, thus providing a tight closure. The cover B is further provided with an opening $B^3$ at its centre and a cylindrical wall $B^4$, the inner surface of which serves as a guide and bearing for the rod C. The rod C may be bent to form a crank C' when the beater is operated manually. Connected to the lower end of the rod C is a disc D having a beaded edge D' formed at its periphery which serves to stiffen the disc and also prevents excessive friction between the disc and bottom of the receptacle when the machine is operated. Blades E—E—E respectively, are formed by stamping or pressing a portion of the disc C into the form illustrated. The lower edge of each blade is disposed on a line or plane with the bottom surface $D^2$ of the bead D' and intended to slightly contact with the bottom of the receptacle and serve to scoop and throw the ingredients upward from the bottom of the receptacle. Mounted on the rod C and fastened thereto is a beater F comprising blades F'—F' etc., arranged in two rows as illustrated and inclined to the horizontal to form propeller elements.

To operate, the ingredients are placed in the receptacle and the crank turned to rotate the beater in the direction indicated by the arrow, which causes the ingredients to be thrown outward by centrifugal force and downward by the propeller blades and thence toward the centre due to the slower radial speed of the propeller blades near the centre, as will be readily understood.

Having thus described our invention, we claim as new and desire to secure by Letters Patent:

1. A machine of the character described comprising a receptacle, a beater comprising a tube having propeller blades located thereon and a disc carrying said beater and resting on the bottom of said receptacle at its periphery.

2. A machine of the character described comprising a receptacle, a beater comprising a tube having propeller blades located thereon and a disc carrying said beater and resting on the bottom of said receptacle at its periphery and having blades extending downward therefrom.

3. A machine of the character described comprising a receptacle, a beater comprising a tube having propeller blades located thereon and a disc carrying said beater and resting on the bottom of said receptacle at its periphery and having blades formed integral therewith and extending downward therefrom.

4. A machine of the character described comprising a cylindrical receptacle having a flat bottom, a cover closely fitting said receptacle and having an opening at its centre, a rod extending through said hole in the cover, a beater comprising a tube mounted on said rod and a disc connected to the lower end of said rod and contacting with the bottom of said receptacle at its periphery.

5. A machine of the character described comprising a cylindrical receptacle having a flat bottom, a cover closely fitting said receptacle and having an opening at its centre, a rod extending through said hole in the cover, a beater comprising a tube mounted on said rod and a disc connected to the lower end of said rod and having a bead which contacts with the bottom of said receptacle, said disc having blades for the purpose described.

6. A machine of the character described comprising a cylindrical receptacle having a flat bottom, a cover closely fitting said receptacle and having an opening at its centre, a rod extending through said hole in the cover, a beater comprising a tube mounted on said rod and a disc connected to the lower end of said rod and having a bead which contacts with the bottom of said receptacle, said disc having blades formed integral therewith for the purpose described.

7. A machine of the character described comprising a cylindrical receptacle having a flat bottom, a cover closely fitting said receptacle and having an opening at its centre, a rod extending through said hole in the cover, a beater mounted on said rod and a disc connected to the lower end of said rod and having a beaded portion contacting with the bottom of said receptacle.

8. A machine of the character described comprising a cylindrical receptacle having a flat bottom, a cover closely fitting said receptacle and having an opening at its centre, a rod extending through said hole in the cover, a beater mounted on the rod comprising a removable tube having propeller blades mounted thereon and a disc connected to the lower end of said rod and contacting with the bottom of said receptacle at its periphery.

9. A machine of the character described comprising a cylindrical receptacle having a flat bottom, a cover closely fitting said receptacle and having an opening at its centre, a rod extending through said hole in the cover, a beater mounted on said rod comprising a removable tube and a disc extending over the bottom of the receptacle and connected to the lower end of said rod and contacting with the bottom of said receptacle at its periphery.

Signed at New York city in the county of New York and State of New York this 12th day of January A. D. 1920.

HENRY TRUST.
FRANK M. ASHLEY.